United States Patent
Deleule et al.

(10) Patent No.: US 12,066,881 B2
(45) Date of Patent: Aug. 20, 2024

(54) MOTION BASED DEVICE WAKE UP

(71) Applicants: STMicroelectronics, Inc., Coppell, TX (US); STMICROELECTRONICS (BEIJING) R&D CO. LTD, Beijing (CN); STMicroelectronics (Grenoble 2) SAS, Grenoble (FR)

(72) Inventors: Arnaud Deleule, San Jose, CA (US); Kalyan-Kumar Vadlamudi-Reddy, San Jose, CA (US); Darin K Winterton, San Jose, CA (US); Jihong Chen, Beijing (CN); Olivier Lemarchand, Grenoble (FR)

(73) Assignees: STMICROELETRONICS (BEIJING) R&D CO., LTD., Beijing (CN); STMicroelectronics (Grenoble 2) SAS, Grenoble (FR); STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 17/806,813

(22) Filed: Jun. 14, 2022

(65) Prior Publication Data
US 2023/0400904 A1 Dec. 14, 2023

(51) Int. Cl.
*G06F 1/32* (2019.01)
*G01S 13/08* (2006.01)
*G06F 1/3231* (2019.01)
*G06F 1/3234* (2019.01)

(52) U.S. Cl.
CPC ........... *G06F 1/3231* (2013.01); *G01S 13/08* (2013.01); *G06F 1/3265* (2013.01)

(58) Field of Classification Search
CPC .................................................... G06F 1/32
See application file for complete search history.

(56) References Cited

U.S. PATENT DOCUMENTS

| 7,681,059 | B2 | 3/2010 | You et al. |
| 10,373,475 | B2 | 8/2019 | Gear et al. |
| 10,956,734 | B2 | 3/2021 | Shin et al. |

(Continued)

OTHER PUBLICATIONS

STMicroelectronics, UM2884, "A guide to using the VL53L5CX multizone Time-of-Flight ranging sensor with wide field of view Ultra Lite Driver (ULD)," Sep. 3, 2021, 19 pages.

(Continued)

*Primary Examiner* — Paul B Yanchus, III
(74) *Attorney, Agent, or Firm* — Slater Matsil, LLP (57) ABSTRACT

A method for operating an electronic device includes while a display is in low power mode, detecting based on data collected by a time of flight (ToF) sensor, a movable object within a field of view of the electronic device; in response to the detecting initiating a period of detection having a plurality of frames, the period of detection being a time period over which a distance value indicative of a distance between the movable object and the display is detected; for each of the plurality of frames, changing the distance value to reflect whether the movable object is moving near or further from the electronic device; detecting that the distance value after the period of detection is less than a threshold distance value indicative of the movable object approaching the display; if the distance value is less than the threshold distance value, waking up the display.

18 Claims, 7 Drawing Sheets

(56) References Cited

U.S. PATENT DOCUMENTS

| | | | |
|---|---|---|---|
| 11,656,678 B1* | 5/2023 | Pundak | G06F 3/011 |
| | | | 345/156 |
| 2016/0161339 A1 | 6/2016 | Tan | |
| 2020/0142471 A1* | 5/2020 | Azam | G06F 1/3265 |
| 2021/0109486 A1* | 4/2021 | Hamlin | G05B 13/0265 |
| 2021/0373643 A1 | 12/2021 | Herrington et al. | |

OTHER PUBLICATIONS

STMicroelectronics, UM2887, "A software integration guide to implement the ultra light driver of the VL53L5CX Time-of-Flight 8 × 8 multizone ranging sensor with wide field of view," Jun. 9, 2021, 7 pages.

STMicroelectronics, VL53L5CX Datasheet, "Time-of-Flight 8×8 multizone ranging sensor with wide field of view," Dec. 15, 2021, 38 pages.

STMicroelectronics, VL53L5CX Datasheet, "Time-of-Flight 8×8 multizone ranging sensor with wide field of view," Sep. 6, 2021, 2 pages.

STMicroelectronics, VL53L5CX Data Brief, "Time-of-Flight 8×8 multizone ranging sensor with wide field of view," Jun. 10, 2021, 5 pages.

YouTube Video, "Gesture Tracking on Thermostat with VL53L5CX,"—httpswww.youtube.comwatchv=ufkdqY4NJMo, Aug. 9, 2021, 1 page.

\* cited by examiner

MOTION BASED DEVICE WAKE UP

TECHNICAL FIELD

The present invention relates generally to a system and method for operating an electronic device having a display, and particularly to motion detection.

BACKGROUND

Displays are becoming increasingly used on more devices. For example, displays may be used on everything from handheld electronic device such as phones, video games, desktop computers, laptops, and application-specific products such as thermostats. In operation, to save power consumption, displays are configured to enter a low-power mode when they are not in use. Displays may be configured to enter low power mode after a period of idle time when they are not being used. This is known as sleep mode. In sleep mode, the display is selectively shut down to conserve power.

While in sleep mode, if the device detects a user activity such as keyboard input or mouse movement, the display is turned back on. This is known as wake-up. In recent years to achieve an improved wake up time, the display may include a senor and may be configured to wake up once the sensor detects a user.

However, waking up a display based on the presence of a user comes with its own set of disadvantages. For example, false wake-ups may take place when a user is detected while just passing by the device. These false wake-ups may increase the power consumption of the device.

SUMMARY

In an embodiment, a method for operating an electronic device includes: while the display is in a low power mode, detecting, by a controller based on data collected by a time of flight (ToF) sensor, a movable object within a field of view of the electronic device; in response to the detecting initiating a period of detection having a plurality of frames, the period of detection being a time period over which the controller detects a distance value indicative of a distance between the movable object and the display; for each of the plurality of frames, changing the distance value to reflect whether the movable object is moving near or further from the electronic device; detecting that the distance value after the period of detection is less than a threshold distance value indicative of the movable object approaching the display; and in response to determining that the distance value is less than the threshold distance value, waking up the display.

In an embodiment, a method for operating a display of an electronic device includes: determining, at a controller of the electronic device, that a movable object is approaching the display; determining, at the controller, that the movable object underwent a change in direction of motion away from the display; and in response to determining that the movable object underwent the change in direction, preventing a false wake up of the display.

In an embodiment, an electronic device includes: a time of flight (ToF) sensor attached to a display; a controller; and a memory for storing a program to be executed in the controller, the program including instructions when executed cause the controller to: while the display is in a low power mode, detect a movable object within a field of view of the electronic device and in response, initiate a period of detection having a plurality of frames, the period of detection being a time period over which the controller detects a distance value indicative of a distance between the movable object and the display; for each of the plurality of frames, change the distance value to reflect whether the movable object is moving near or further from the electronic device; detect that the distance value after the period of detection is less than a threshold distance value indicative of the movable object approaching the display; and in response to determining that the distance value is less than the threshold distance value, wake up the display.

In an embodiment, a method for operating an electronic device includes: detecting, by a controller based on data collected by a time of flight (ToF) sensor, that a distance between a movable object and a display of the electronic device is within a first distance while the display is in a low power mode in a first frame of a plurality of frames within a period of detection, the period of detection being a time period over which the controller detects a distance value indicative of a distance between the movable object and the display; in response to determining, by the controller, that a distance between the movable object and the display in a second frame is less than the distance between the movable object and the display in the first frame, decrementing the distance value, the second frame being the frame immediately following the first frame; determining, by the controller, that the distance value is less than a threshold distance value indicative of the movable object approaching the display; and in response to determining that the distance value is less than the threshold distance value, waking up the display.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A-2B illustrate schematic drawings of an electronic device waking from sleep mode based on detecting that a movable object is approaching the electronic device, where FIG. 2A illustrates a movable object approaching the electronic device.

FIGS. 3A-3B illustrate schematic drawings of a movable object (e.g. a user) passing by an electronic device without the electronic device waking up from sleep mode, where FIG. 3A illustrates a movable object passing by the electronic device, and FIG. 3B illustrates a graphical example of a distance value being updated based on data collected by a ToF sensor affixed to the front of the electronic device as the user passes by;

DETAILED DESCRIPTION OF ILLUSTRATIVE EMBODIMENTS

In operation, to save power consumption, electronic devices are configured to enter a low-power mode when they are not in use. Electronic devices may enter low power mode after a period of idle time when they are not being used. This is known as sleep mode. In sleep mode, components of the electronic device including the display are selectively shut down to conserve power.

Waking-up electronic devices may require an user input such as a keyboard stroke, or pressing of a button. Typically, to achieve a faster wake-up time while in sleep mode, a sensor, such as an infrared sensor or a camera, may be used to detect the presence of an user. The electronic device may enter active mode and power on the display after detecting the user. This is known as wake-up based on human presence detection (HPD).

While it is advantageous to wake-up the device before the user starts using the same from a user experience point of view, erroneously waking up the display can cause power wastage and potentially drain the battery significantly reducing the value of the sleep mode. Thus, there is a balance between wake-ups to enhance user experience with being in sleep mode longer to save power. Quite often, false wake-ups may be triggered by events that does not directly result in the user using the device. For example, when a user passing, the device may wake-up until again going back to sleep. This can reduce the battery lifetime significantly especially if the device is located in a high-traffic area such as an airport walkway.

Embodiments of the present application relate to an electronic device configured to only wake-up if a movable object is approaching a display. Various embodiments help eliminate false wake-ups because of passerby's.

Figure 1:
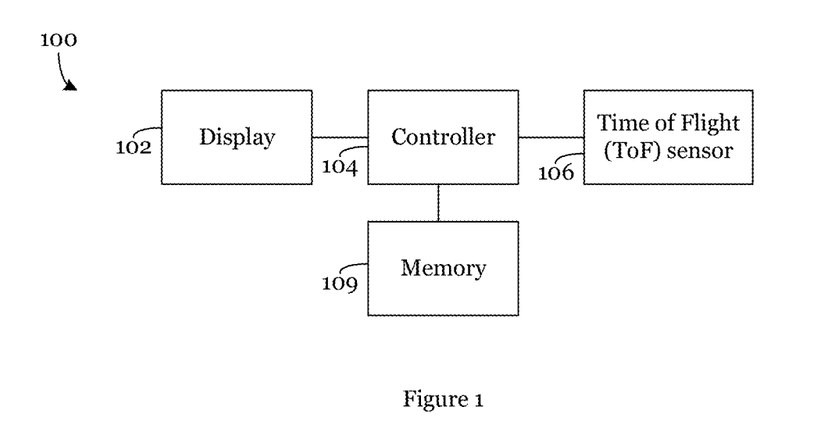
FIG. 1 illustrates an electronic device configured to prevent false display wake-ups according to an embodiment of the present application.

FIG. 1 illustrates an electronic device configured to prevent false display wake-ups according to an embodiment of the present application.

Referring to FIG. 1, an electronic device 100 may include a display 102, a controller 104 and a time of flight (ToF) sensor 106. In various embodiments, the electronic device 100 may be any device that utilizes a display 102. For example, the electronic device 100 may be a smart phone, tablet, desktop computer, laptop, a thermostat, or the like.

In various embodiments, the ToF sensor 106 may be affixed to the electronic device 100 so that the ToF sensor 106 can collect data corresponding to the distance between the display 102 and a target object in front of the display 102. The ToF sensor 106 may be affixed to the front of the electronic device 100. The ToF sensor 106 may be configured to emit signals and transmit data to the controller 104 based on received signals reflected off target objects. Specifically, the ToF sensor 106 may be affixed to the electronic device 100 so that it can transmit data to the controller 104 corresponding to a distance between a movable object and the display 102. The distance data collected by the ToF sensor 106 may be used to determine whether to wake-up the electronic device 100 from sleep mode.

The controller 104 may comprise a processor, microprocessor, or any other type of controller known in the art. The controller 104 may be configured to analyze information and carry out a series of executable scripts, e.g., stored in a memory 109. The memory 109 may be integrated in the controller 104 or may be separate. In various embodiments, the memory 109 may be programmed for short term and/or long term memory storage. The memory 109 may be configured to store data generated by the controller 104 and may comprise various programs to be executed in the controller 104. The memory 109 may include both volatile and non-volatile memories.

The controller 104 may operate the electronic device 100 in sleep mode and active mode. Sleep mode, also known as standby, suspend, or suspend to random access memory (RAM) is when the controller 104 cuts power to unneeded components (e.g., the display 102) and places RAM into a low power state. The low power state holds just enough power to retain data. To conserve power, the controller 104 may enter sleep mode after an idle time in which the electronic device 100 is not in use.

As described above, electronic devices including a display may wake-up from sleep mode and enter active mode based on human presence detection (HPD). Conventionally, as soon as an electronic device detects the presence of a movable object it exits sleep and enters active mode. However, a HPD may occur when a movable object is just passing by the electronic device 100 with no intention to use the device. For example, a movable object may just be passing by a thermostat or a computer at a close enough proximity to be detected. This may result in a false wake-up of the device and an increase in power consumption.

Advantageously, based on the data collected by the ToF sensor 106, in various embodiments, the electronic device 100 may be configured to wake-up from sleep mode when approached by movable object. In other words, the electronic device 100 is able to decipher whether a movable object is passing by or approaching towards the device, and wake-up only if the movable object is approaching. This will be discussed in more detail below.

Figure 2A:
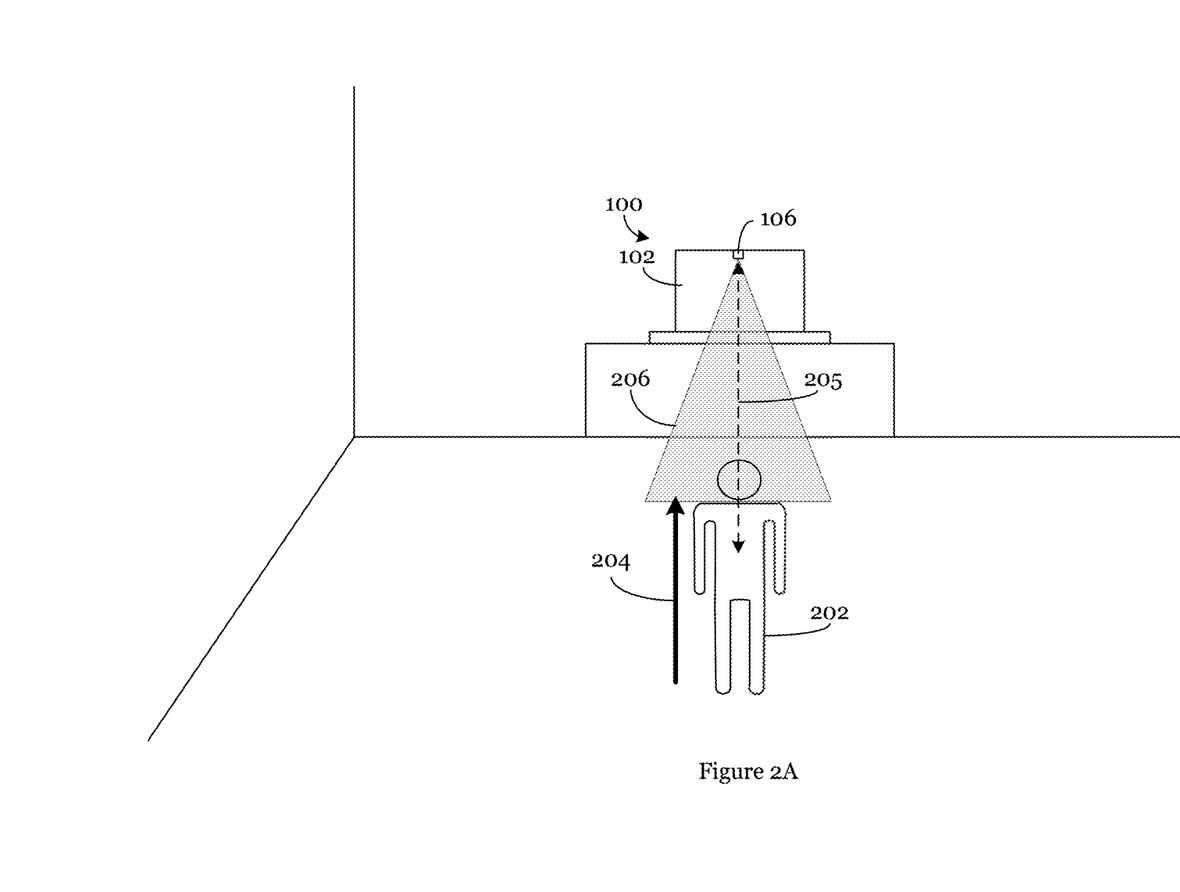
Figure 2B:
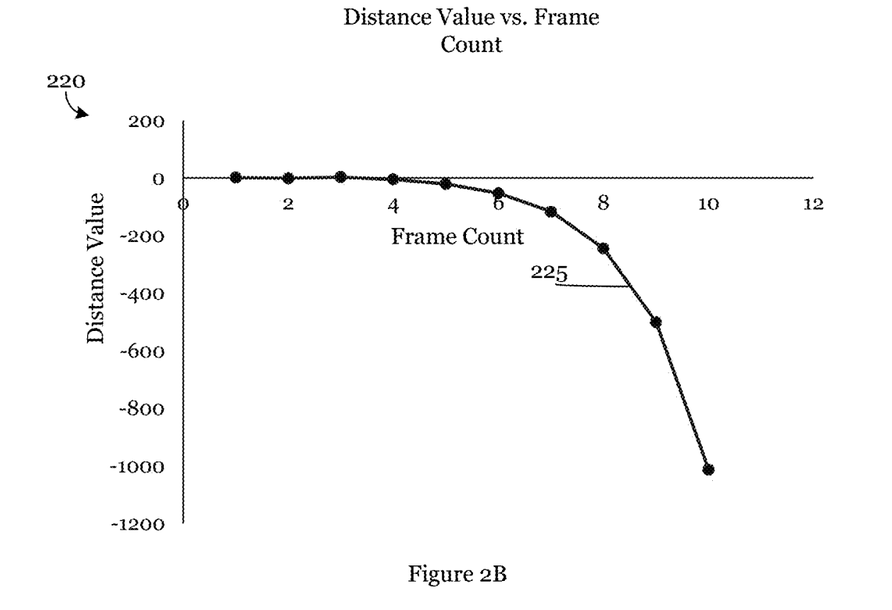
FIG. 2B illustrates a graphical example of a distance value being updated based on data collected by a ToF sensor affixed to the front of the electronic device while the user is approaching the electronic device.

FIGS. 2A-2B illustrate schematic drawings of an electronic device waking from sleep mode based on detecting that a movable object is approaching the electronic device, where FIG. 2A illustrates a movable object approaching the electronic device, and FIG. 2B illustrates a graphical example of a distance value being updated based on data collected by a ToF sensor affixed to the front of the electronic device.

FIG. 2A illustrates a movable object 202 approaching the electronic device 100. For example, the movable object may be a user. A movable object 202 approaching the electronic device 100 moves towards the display 102. In other words, when the movable object 202 is approaching the electronic device 100, the movable object 202 enters the field of view (FOV) 206 of the ToF sensor 106 and moves towards the display 102. While the movable object 202 approaches the display 102, the display distance 205, e.g., the distance between the display 102 and the movable object 202, decreases over time.

While in sleep mode, the controller 104 is also in a low power sleep mode. In low power sleep mode, the ToF sensor 106 will operate in Autonomous mode without any controller 104 activity. While the ToF sensor 106 is not detecting the movable object 202, the controller 104 will remain in low power sleep mode. On the other hand, if the ToF sensor 106 detects the movable object 202 within a minimum display distance, the sensor will trigger an interrupt, and wake-up the controller 104 while the display 102 remains in sleep mode. In other words, the controller 104 remains in low power sleep mode until the movable object 202 is within the minimum display distance.

After the ToF sensor 106 triggers an interrupt, to determine whether to wake-up the display 102 from sleep mode, the controller 104 monitors the display distance 205 determined by the ToF sensor 106 over a period of a plurality of frames. In various embodiments, the period of detection may be a period of time in which the controller 104, over a plurality of frames, updates a distance value corresponding to the display distance 205. The period of detection may range between five frames and twenty frames, for example, ten frames.

In various embodiments, the quantity of frames in the period of detection may be determined based on system latency requirements. The accuracy of catching wake-ups without false wake-ups may be improved by having a higher number of frames but may increase power consumption. However, the time to detect an approaching user may increase if the number of the frames is lowered. Therefore, there is a trade-off between latency and accuracy when determining the period of detection.

Each of the frames may have a duration between 5 and 15 ms for example 10 ms. Similarly, the longer the time duration of each frame, the higher the accuracy of wake-ups. However, longer frame durations cause longer wake-up times. Therefore, there is a trade-off between latency and accuracy when determining the duration of each of the frames.

As described above, in each frame within the period of detection, the controller 104 may update a distance value based on the display distance 205 determined by the ToF sensor 106. The distance value may be updated using a time-weighted increment or decrement value that is based on a current frame count. This will be described in more detail below.

The distance value may be decremented or incremented based on whether the distance data collected by the ToF sensor 106 indicates that the movable object 202 is approaching the display 102 or moving away from the display 102 respectively. When the movable object 202 is within the field of view (FOV) 206 and the display distance 205 decreases between subsequent frames, the movable object 202 is indicated to be approaching the display 102. Therefore, the distance value may be decremented. On the other hand, if the movable object 202 is within the FOV 206 but the display distance 205 increases between subsequent frames, the distance value is incremented because the object is moving away from the device. Of course, in addition, if the display distance 205 does not change between frames, the distance value remains the same.

In various embodiments, the controller 104 is in a low power sleep mode until the movable object 202 is both within the FOV 206 and within the minimum display distance. The minimum display distance defines a zone of interest around the display over which the display device performs the calculations for determining whether to wake up the display. This avoids processing when the object is far off so as to conserve power at the display device. The minimum display distance may be between 1 m and 2 m, for example 1.5 m. Therefore, even though the ToF sensor 106 may determine the display distance 205 decreases, the controller 104 remains in low power sleep mode unless the movable object 202 is within the minimum display distance.

FIG. 2B illustrates a graphical representation of the distance value in each frame within a period of detection as a movable object approaches the electronic device in accordance with an embodiment.

Referring to FIG. 2B, the x-axis of graph 220 represents the current frame count within a period of detection and the y-axis represents the distance value. In other words, the curve of graph 220 represents the distance value 225 in each frame within the period of detection as the distance value 225 is updated in each frame. Although ten frames are used in the example in FIG. 2B, this is for example purposes only. As described above, any suitable number of frames may be used.

As illustrated in graph 220, once the movable object 202 is within the minimum display distance and is approaching the electronic device 100, the distance value 225 is updated at each frame. In various embodiments, the distance value 225 may be updated using functions that weight the current frame more than the prior frames. In one embodiment, the distance value 225 may be updated by a time-weighted value based on a current frame count. In one embodiment, the distance value 225 may be updated using the following equation:

$$d = \sum_{f=0}^{f} \pm x^f$$

Where d represents the distance value 225, x represents a predetermined constant, and f represents the current frame count. In various embodiments, the predetermined constant x may be within a range from 1.1-4, for example 2.

In another illustration, the distance value may be updated by the value of the present time multiplied with a predetermined constant, i.e., $\Sigma y * f^n$, where f is the current frame number, n is a power exponent, and y is a predetermined constant. In an illustration, y may be 1, while n may be 2.

Referring back to graph 220, in a first frame, the movable object 202 is at a display distance 205 that is less than or equal to the minimum display distance. Therefore, at the first frame, the distance value 225 is set to a fixed numerical value (e.g., zero in one example). At the second frame, the movable object 202 moves closer to the display 102. Therefore, the display distance 205 decreased relative to the first frame. At the second frame, as an example, the current frame count is equal to one when the first frame has a count of zero. Therefore, the predetermined constant (x) raised to the power of one is subtracted from the distance value 225 of the first frame to obtain the distance value 225 of the second frame.

At a third frame, the movable object 202 is still within the minimum display distance, however, the movable object 202 moved away from the display causing the display distance 205 to increase. Therefore, the distance value 225 is incremented. At the third frame, the current frame count is two, therefore, the constant raised to the power of two is added to the distance value 225.

Then in each of the remaining frames, the movable object 202 changes track and moves towards the display causing the display distance 205 to decrease. Because of this, the distance value 225 is decremented continuously in the succeeding frames. For example, in the fourth frame, the distance value 225 is incremented by $2^3$.

In various embodiments, the controller 104 may not wake-up the display 102 until the distance value 225 falls below a threshold distance value. The threshold distance value may be a distance value 225 that indicates that the movable object 202 is approaching the display 102. The threshold distance value may be preconfigured or configured by a user. For example the threshold distance value may be determined by a calibration performed in the specific environment before use or the calibration may be performed during initial use of the display device. For example, by calculating the distance value whenever a user is observed within the zone of interest and correlating with the times when the user actually activated the display device, the threshold distance value for that display and room can be determined during a initial training process. In addition, the estimates may be periodically corrected so that the accuracy of the determination is maintained if the display is moved to a new location. As an example, the threshold distance value may be set up to be the distance value of the first frame at the start of the period of detection. As another example, the threshold distance value may be set up so that a continued decrease in calculated distance value is observed in five consecutive frames before a wake-up command is initiated. In another example, the threshold distance value may be set up so that a continued decrease in calculated distance value is observed in six consecutive frames before a wake-up command is initiated.

In other embodiments, the controller 104 may not wake-up the display unless the distance value 225 in the last frame is less than the threshold distance value. In this case, the threshold distance value may be configured or preconfigured in the same manner described above, or may be equal to a fixed distance value.

Advantageously, because the controller 104 only decrements the distance value 225 when the movable object 202 approaches the display 102, the electronic device 100 will only wake-up when the movable object 202 is approaching the device. Advantageously, by preventing false wake-ups, embodiments conserve power and extend battery life and performance.

Figure 3A:
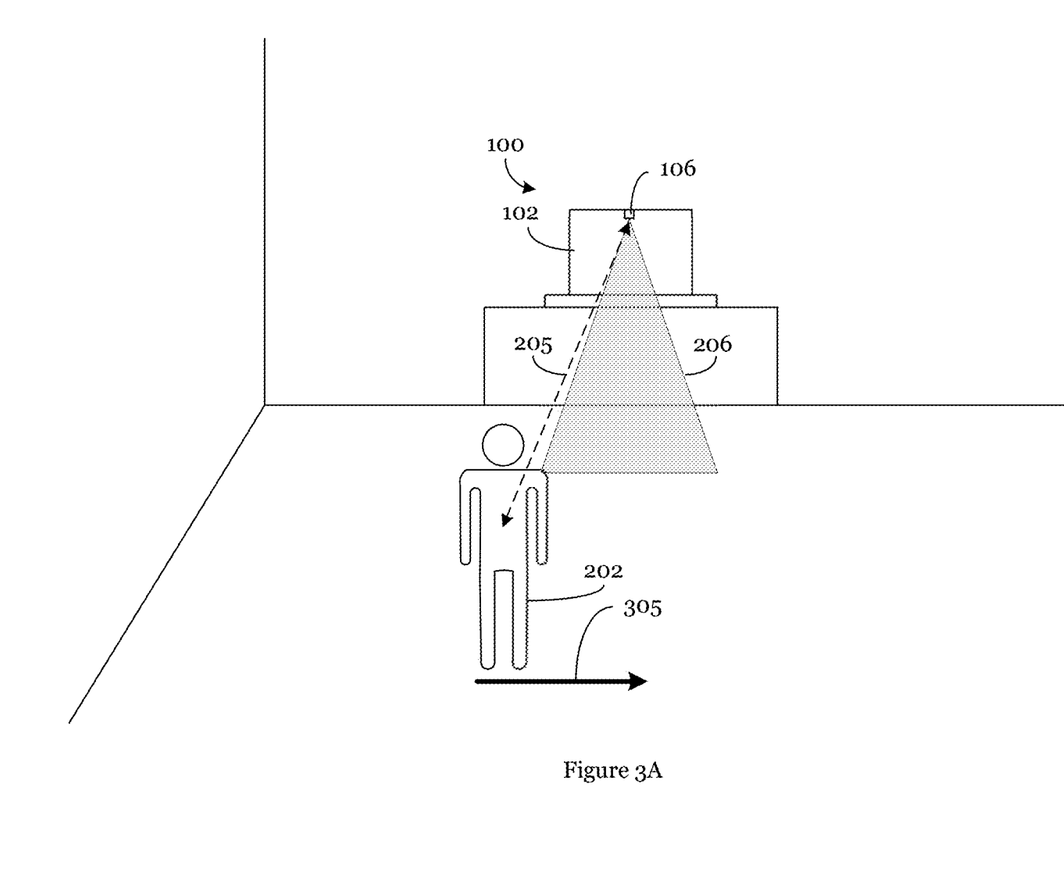
Figure 3B:
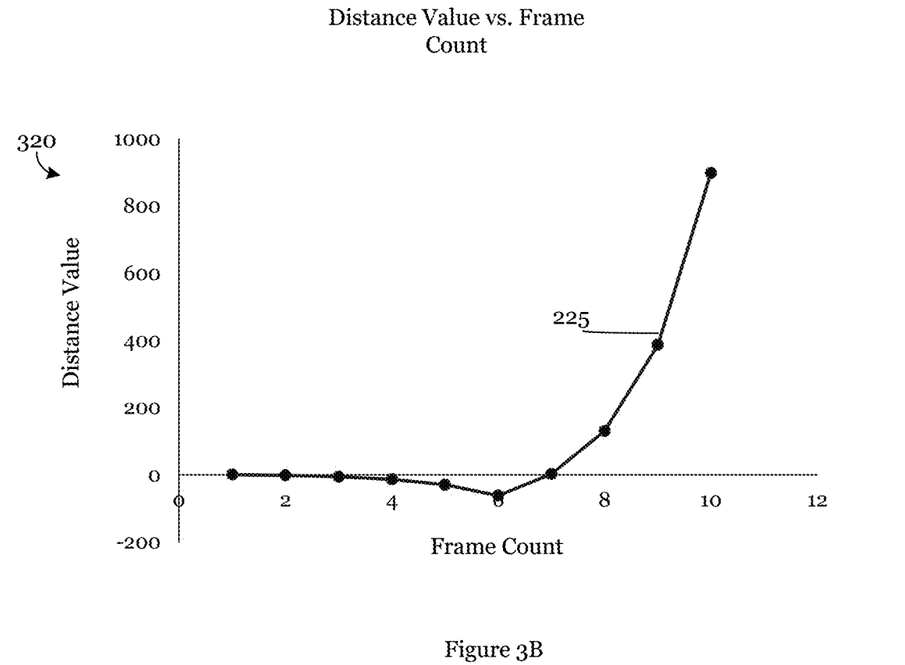

FIGS. 3A-3B illustrate schematic drawings of a user passing by an electronic device without the electronic device waking up from sleep mode, where FIG. 3A illustrates a movable object passing by the electronic device, and FIG. 3B illustrates a graphical example of a distance value being updated based on data collected by a ToF sensor affixed to the front of the electronic device as the movable object passes by.

Referring to FIG. 3A, a movable object 202 (e.g. a user) is passing by the display 102 if the movable object 202 is moving substantially parallel to the display 102. A movable object 202 passing by the display 102 is moving in direction 305. In other words, instead of remaining in the FOV 206 and approaching the display 102, the movable object 202 is passing through the FOV 206. Therefore, the display 102 should not wake-up.

Regardless of whether the movable object 202 is passing by the display 102 or approaching the display, a time weighted approach such as illustrated in Eq. 1 above may be used to increment/decrement the distance value 225. This is described in more detail below.

Referring to FIG. 3B, graph 320 illustrates the distance value 225 as the movable object 202 passes by the display 102.

The x-axis of graph 320 represents the current frame count within a period of detection and the y-axis represents the distance value. In other words, the curve of graph 320 represents the distance value 225 in each frame within the period of detection as the distance value 225 is updated in each frame. As described above, although ten frames are used in the example in FIG. 3B, this is for example purposes only. Any suitable number of frames may be used.

In the same manner described above, once the movable object 202 is within the FOV 206 and the minimum display distance, the ToF sensor 106 may trigger an interrupt. Once the ToF 106 sensor triggers an interrupt, the controller 104 may wake up from lower power sleep mode and may begin incrementing/decrementing a distance value 225 across a plurality of frames. The distance value 225 starts at a fixed numerical value (e.g., zero in one example) in the first frame. Next, in a second frame, as the movable object 202 moves along direction 305, and towards the center of the FOV 206. Because the movable object 202 is moving towards the center of the FOV 206, the display distance 205 may initially decrease until the inflection point (closest distance). Therefore, the distance value 225 is decremented. For the next, four frames (e.g. frames 2-6) as the movable object 202 moves towards the center of the FOV 206, the display distance 205 decreases. The distance value 225 is then decremented for frames 3-6.

However, even though the distance value 225 is decremented in frames 2-6, because the distance value 225 is time-weighted based on frame count, once the movable object 202 passes the center of the FOV 206 across the inflection point, the distance value 225 is incremented at higher weights because the distance between the displace and the movable object 202 increases. Advantageously, even though the distance value 225 is decremented in the first few frames, the cumulative value never falls below the threshold distance value and the display 102 does not wake-up.

In other embodiments, the controller 104 may determine whether to wake-up the display 102 after incrementing/decrementing the distance value 225 in each of the plurality of frames. In other words, the controller 104 may not compare the distance value 225 to the threshold distance value until the last frame. The threshold distance value may be configured or preconfigured in the manner described above, or may be equal to the distance value 225 in the first frame. If the distance value 225 is greater than the threshold value in the last frame (as it is in FIG. 3B), the controller 104 determines the movable object is passing-by and the display 102 remains in sleep mode.

In various embodiments, if passing-by is detected, the controller 104 reenters low power sleep mode once the movable object 202 is beyond the minimum display distance and/or outside of the FOV 206. As described above, the ToF sensor 106 will operate in Autonomous mode and only trigger wake-up of the controller 104 again once the movable object is within the FOV 206 and within the minimum display distance.

Figure 4:
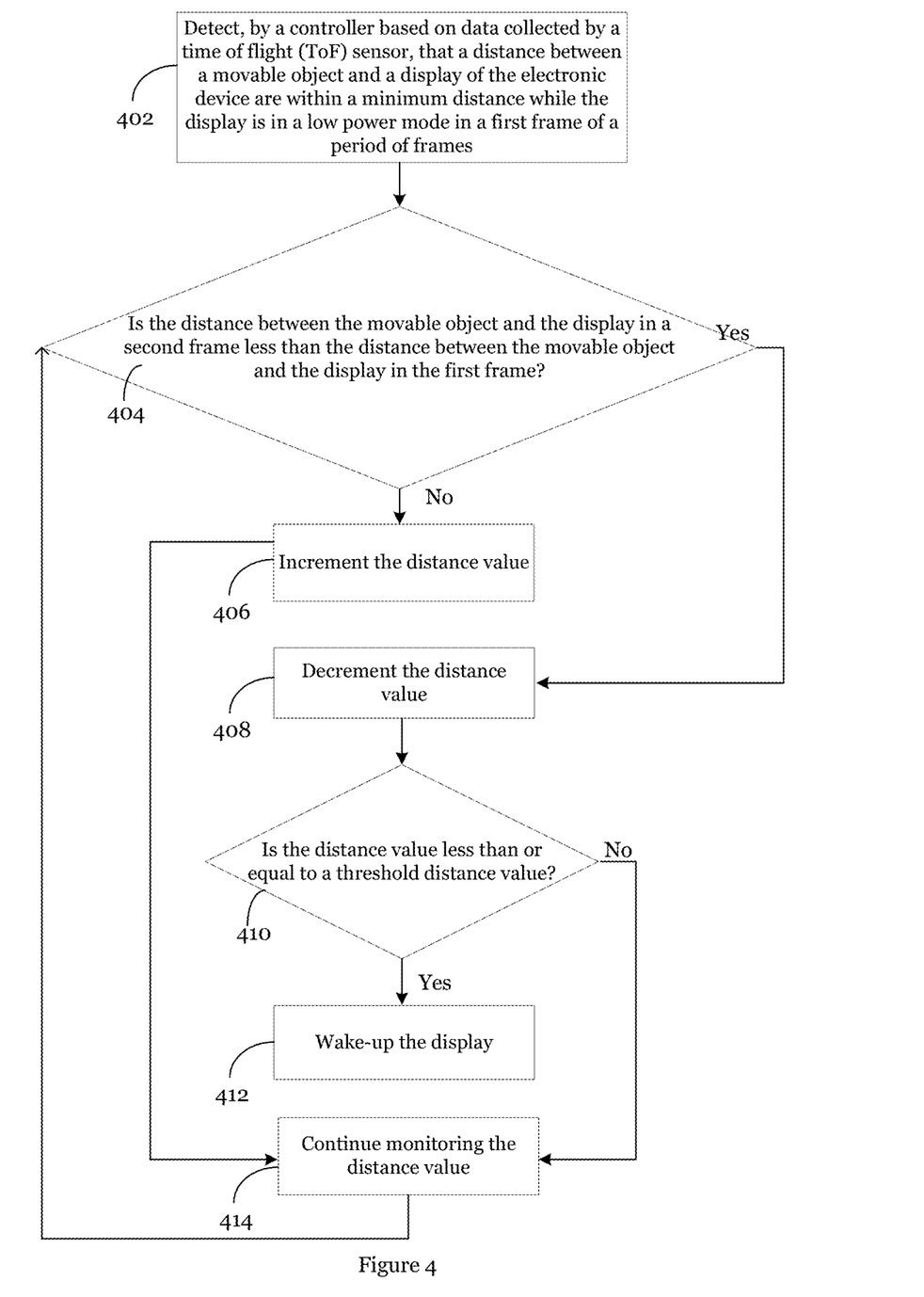
FIG. 4 illustrates a process flow for waking-up a display of an electronic device only when a movable object is approaching a display.

FIG. 4 illustrates a process flow for waking-up a display of an electronic device only when the movable object is approaching a display.

As illustrated in block 402, and described with reference to FIGS. 2A-2B and FIGS. 3A-3B, the controller 104 detects, based on distance data captured by the ToF sensor 106 that a movable object 202, e.g., an user, is within a minimum display distance in a first frame. The first frame may be one frame within a period of detection. The period of detection may be a time period in which the controller 104 assigns or determines a distance value 225 indicative of the display distance 205. The controller 104 may not continuously monitor the scene but may periodically run a scan for the duration of the time period of the frames after the ToF sensor 106 triggers an interrupt. As described above, a distance value 225 may be determined based on changes in the display distance 205. The distance value 225 may begin at a fixed value in the first frame.

As next illustrated in block 404, and described with reference to FIGS. 2A-2B and FIGS. 3A-3B, the controller 104 determines whether the display distance 205 decreases between a first frame and a second frame. The second frame may be a frame in the period of detection immediately following the first frame.

If the display distance 205 decreases between the first frame and the second frame, the method proceeds to blocks 408-410. If the display distance decreases, the controller 104 decrements the distance value 225 (block 408) and checks whether the distance value 225 is less than a threshold distance value (block 410).

On the other hand, if the display distance 205 increases, the method proceeds to blocks 406 and 414, and the controller 104 increments the distance value 225 (block 406) and continues monitoring the distance value 225 (block 414).

As next illustrated in block 410, and described with reference to FIGS. 2A-2B after decrementing the distance value 225, the controller 104 determines whether the distance value 225 is less than or equal to a threshold distance value. The threshold distance value may be a value indicative of the movable object 202 approaching the display 102. The threshold distance value may be preconfigured or configured by the user.

If the distance value 225 is less than or equal to the threshold distance value, the method proceeds to block 412 and the controller 104 wakes up the display 102. For example, the controller 104 may send an interrupt signal to the display controller of the display 102 to initiate wake-up.

On the other hand, if the distance value 225 is greater than the threshold distance value, the controller 104 continues to monitor the distance value 225.

Although the above embodiments have been described in the context of waking-up and powering a display, various embodiments may be applied to operations being performed by the controller based on user detection. For example, based on detecting that a user is approaching the device, the controller may initiate tasks such as booting the device to a higher level of performance, starting user friendly devices such as for example, lighting a keyboard or mouse, powering a heat pad, or light, and others.

In other embodiments, whether the movable object 202 is passing-by or approaching the display 102 may be determined by comparing the distance value 225 to the threshold value in the last frame of the plurality of frames, i.e., after completing the updates to the distance values after all of the plurality of frames in the period of detection are evaluated.

Figure 5:
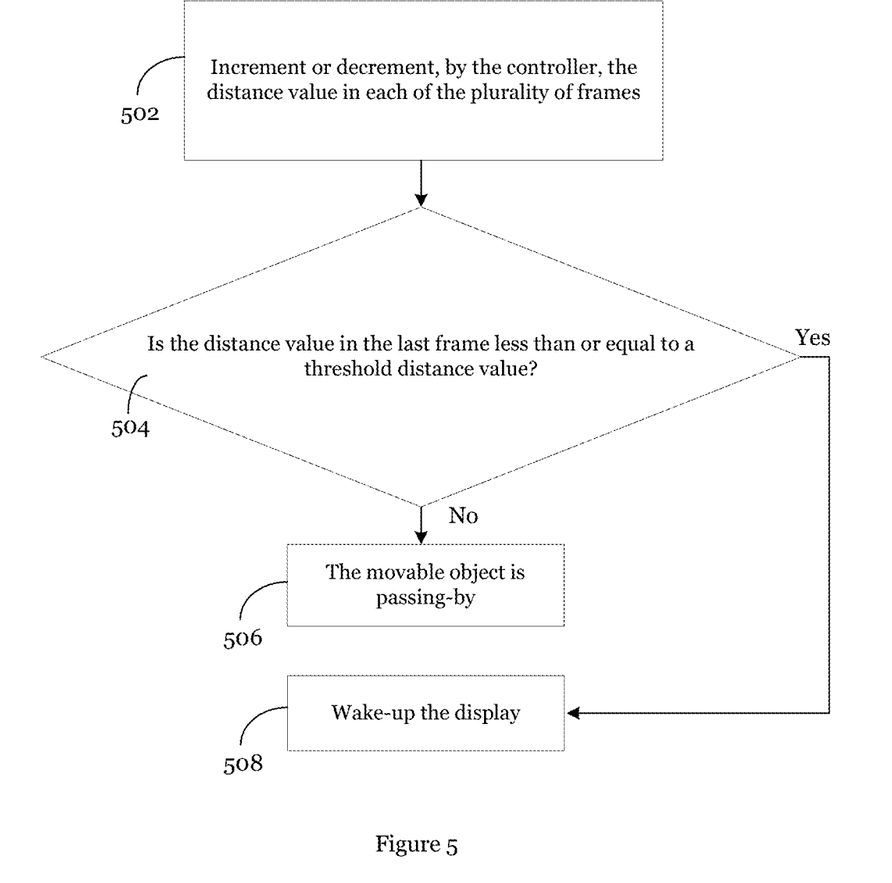
FIG. 5 illustrates a process flow for waking-up a display of an electronic device only when a movable object is approaching a display.

FIG. 5 illustrates a process flow for waking-up a display of an electronic device only when the movable object is approaching a display.

As illustrated in block 502 and described with reference to FIGS. 2A-2B and FIGS. 3A-3B, the controller 104 may increment or decrement a distance value 225 based on the display distance 205 of a movable object in each frame of a plurality of frames.

As next illustrated in block 504 and described with reference to FIGS. 2A-2B and FIGS. 3A-3B, the controller 104 may compare the distance value 225 of the last frame, with a threshold distance value. The threshold distance value may be a configured or pre-configured in the same manner described above, or may be equal to the distance value 225 of the first frame.

If the distance value 225 of the last frame is less than or equal to the threshold distance value, the method proceeds to block 508 and the controller 104 will wake-up the display 102. For example, the controller 104 may send an interrupt signal or wake-up signal to the display controller of the display 102 to initiate wake-up.

On the other hand if the distance value 225 of the last frame is greater than the threshold value, the method proceeds to block 506, and the controller 104 determines the movable object 202 is passing-by, and the display 102 remains in sleep mode. After a certain amount of time with no other objects being detected, the controller 104 may also go back to a low power mode. On the other hand, if a new object is detected within the field of view, the above steps may be repeated to determine whether the display has to be activated.

Example embodiments of the invention are summarized here. Other embodiments can also be understood from the entirety of the specification as well as the claims filed herein.

Example 1. A method for operating an electronic device, the method including: while the display is in a low power mode, detecting, by a controller based on data collected by a time of flight (ToF) sensor, a movable object within a field of view of the electronic device; in response to the detecting initiating a period of detection having a plurality of frames, the period of detection being a time period over which the controller detects a distance value indicative of a distance between the movable object and the display; for each of the plurality of frames, changing the distance value to reflect whether the movable object is moving near or further from the electronic device; detecting that the distance value after the period of detection is less than a threshold distance value indicative of the movable object approaching the display; and in response to determining that the distance value is less than the threshold distance value, waking up the display.

Example 2. The method of example 1, where changing the distance value includes: determining that the distance between the movable object and the display for each of the plurality of frames; incrementing the distance value in response to determining that a distance between the movable object and the display in a current frame is more than a distance between the movable object and the display in an immediately preceding frame; and decrementing the distance value in response to determining that the distance between the movable object and the display in the current frame is less than the distance between the movable object and the display in the immediately preceding frame.

Example 3. The method of one of examples 1 or 2, where changing the distance value includes incrementing or decrementing the distance value by a time-weighted value based on a current frame count of the current frame.

Example 4. The method of one of examples 1 to 3, further including not changing the distance value in response to determining that the distance between the movable object and the display in the current frame is equal to the distance between the movable object and the display in the immediately preceding frame.

Example 5. The method of one of examples 1 to 4, where the threshold distance value is determined using an initial training process.

Example 6. The method of one of examples 1 to 5, where the threshold distance value is a distance value of a first frame in a time sequence of the plurality of frames.

Example 7. The method of one of examples 1 to 6, where waking up the display includes sending an wake-up signal to a display controller of the display.

Example 8. A method for operating a display of an electronic device, the method including: determining, at a controller of the electronic device, that a movable object is approaching the display; determining, at the controller, that the movable object underwent a change in direction of motion away from the display; and in response to determining that the movable object underwent the change in direction, preventing a false wake up of the display.

Example 9. The method of example 8, where determining that the movable object underwent a change in direction of motion includes: in response to determining that the movable object is approaching the display, initiating a period of detection having a plurality of frames, the period of detection being a time period over which the controller detects a distance value indicative of a distance between the movable object and the display; for each of the plurality of frames, changing the distance value to reflect whether the movable object is moving near or further from the electronic device; detecting that the distance value after the period of detection is more than a threshold distance value indicative of the movable object approaching the display; and in response to determining that the distance value is more than the threshold distance value, maintaining the display in a low power mode.

Example 10. The method of one of examples 8 or 9, where the threshold distance value is a distance value of a first frame in a time sequence of the plurality of frames.

Example 11. The method of one of examples 8 to 10, where determining that the movable object is approaching the display includes determining that a distance between the movable object and the display in a second frame of a plurality of frames within a period of detection is less than the distance between the movable object and the display in a first frame of the plurality of frames, the second frame being a frame immediately following the first frame, and the period of detection being a time period over which a controller assigns a distance value indicative of a distance between the movable object and the display.

Example 12. The method of one of examples 8 to 11, where determining that the movable object underwent a change in direction of motion away from the display includes determining that a distance between the movable object and the display in a third frame of the plurality of frames is greater than the distance between the movable object and the display in the second frame.

Example 13. The method of one of examples 8 to 12, further including: determining that a further movable object is approaching the display; determining that the further movable object is directed towards the display; and in response to determining that the further movable object is directed towards to the display, activating a wake-up command to initiate waking up the display.

Example 14. The method of one of examples 8 to 13, where determining that the further movable object is directed towards the display includes in response to determining that the further movable object is approaching the display, initiating a further period of detection having a further plurality of frames, the further period of detection being a further time period over which the controller detects a further distance value indicative of the distance between the movable object and the display; for each of the further plurality of frames, changing the distance value to reflect whether the movable object is moving near or further from the electronic device; and detecting that the further distance value after the further period of detection is less than a threshold distance value indicative of the movable object approaching the display.

Example 15. An electronic device including: a time of flight (ToF) sensor attached to a display; a controller; and a memory for storing a program to be executed in the controller, the program including instructions when executed cause the controller to: while the display is in a low power mode, detect a movable object within a field of view of the electronic device and in response, initiate a period of detection having a plurality of frames, the period of detection being a time period over which the controller detects a distance value indicative of a distance between the movable object and the display; for each of the plurality of frames, change the distance value to reflect whether the movable object is moving near or further from the electronic device; detect that the distance value after the period of detection is less than a threshold distance value indicative of the movable object approaching the display; and in response to determining that the distance value is less than the threshold distance value, wake up the display.

Example 16. The device of example 15, where the instructions to change the distance value include instructions to: determine that the distance between the movable object and the display for each of the plurality of frames; increment the distance value in response to determining that a distance between the movable object and the display in a current frame is more than a distance between the movable object and the display in an immediately preceding frame; and decrement the distance value in response to determining that the distance between the movable object and the display in the current frame is less than the distance between the movable object and the display in the immediately preceding frame.

Example 17. The device of one of examples 15 or 16, where the instructions to change the distance value include instructions to: increment or decrement the distance value by a time-weighted value based on a current frame count of the current frame.

Example 18. The device of one of examples 15 to 17, where the instructions further include instructions to not change the distance value in response to determining that the distance between the movable object and the display in the current frame is equal to the distance between the movable object and the display in the immediately preceding frame.

Example 19. The device of one of examples 15 to 18, where the threshold distance value is determined using an initial training process.

Example 20. The device of one of examples 15 to 19, where the threshold distance value is a distance value of a first frame in a time sequence of the plurality of frames.

Example 21. A method for operating an electronic device, the method including: detecting, by a controller based on data collected by a time of flight (ToF) sensor, that a distance between a movable object and a display of the electronic device is within a first distance while the display is in a low power mode in a first frame of a plurality of frames within a period of detection, the period of detection being a time period over which the controller detects a distance value indicative of a distance between the movable object and the display; in response to determining, by the controller, that a distance between the movable object and the display in a second frame is less than the distance between the movable object and the display in the first frame, decrementing the distance value, the second frame being the frame immediately following the first frame; determining, by the controller, that the distance value is less than a threshold distance value indicative of the movable object approaching the display; and in response to determining that the distance value is less than the threshold distance value, waking up the display.

Example 22. The method of example 21, further including in response to determining that the distance between the movable object and the display in a third frame is greater than the distance between the movable object and the display in the second frame, incrementing the distance value.

Example 23. The method of one of examples 21 or 22, further including in response to determining that the distance between the movable object and the display in a third frame is equal to the distance between the movable object and the display in the second frame, keeping constant the distance value.

Example 24. The method of one of examples 21 to 23, where the distance value is decremented based on a time-weighted value based on a current frame count.

Example 25. The method of one of examples 21 to 24, where decrementing the distance value including subtracting from the distance value of the first frame, a value calculated from a current frame count.

Example 26. The method of one of examples 21 to 25, where the threshold distance value is determined using an initial training process.

Example 27. The method of one of examples 21 to 26, where, determining that the distance value is less than the threshold distance value indicative of the movable object approaching the display, includes determining the distance value in the last frame of the plurality of frames to the threshold distance value.

Example 28. The method of one of examples 21 to 27, where the threshold distance value is equal to the distance value of the first frame.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating an electronic device, the method comprising:
    while a display is in a low power mode, detecting, by a controller based on data collected by a time of flight (ToF) sensor, a movable object within a field of view of the electronic device;
    in response to the detecting initiating a period of detection having a plurality of frames, the period of detection being a time period over which the controller detects a distance between the movable object and the display;
    for each of the plurality of frames, changing a distance value associated with the corresponding frame to reflect whether the movable object is moving near or further from the electronic device, wherein in response to determining that the movable object is moving near or further from the electronic device, changing the distance value comprises incrementing or decrementing the distance value of an immediately preceding frame by a change value that increases with increasing frame count of the plurality of frames within the period of detection;
    detecting that the distance value after the period of detection is less than a threshold distance value indicative of the movable object approaching the display; and
    in response to determining that the distance value is less than the threshold distance value, waking up the display.

2. The method of claim 1, wherein changing the distance value comprises:
    determining that the distance between the movable object and the display for each of the plurality of frames;
    incrementing the distance value in response to determining that a distance between the movable object and the display in a current frame is more than a distance between the movable object and the display in the immediately preceding frame; and
    decrementing the distance value in response to determining that the distance between the movable object and the display in the current frame is less than the distance between the movable object and the display in the immediately preceding frame.

3. The method of claim 2, further comprising not changing the distance value in response to determining that the distance between the movable object and the display in the current frame is equal to the distance between the movable object and the display in the immediately preceding frame.

4. The method of claim 1, wherein the threshold distance value is determined using an initial training process.

5. The method of claim 1, wherein the threshold distance value is a distance value of a first frame in a time sequence of the plurality of frames.

6. The method of claim 1, wherein waking up the display comprises sending a wake-up signal to a display controller of the display.

7. A method for operating a display of an electronic device, the method comprising:
    determining, at a controller of the electronic device, that a movable object is approaching the display;
    determining, at the controller, that the movable object underwent a change in direction of motion away from the display, wherein determining that the movable object underwent a change in direction of motion comprises:
    in response to determining that the movable object is approaching the display, initiating a period of detection having a plurality of frames, the period of detection being a time period over which the controller determines a distance between the movable object and the display,
    for a first frame of the plurality of frames within the time period of detection, assigning a distance value associated with the first frame and a frame count associated with the first frame,
    for each subsequent frame of the plurality of frames, assigning a distance value associated with the respective frame based on whether the movable object is moving near or further from the electronic device, wherein assigning the distance value comprises
        incrementing the frame count associated with the respective frame, and
        incrementing or decrementing the distance value of a previous frame by a change value that increases with the incrementing frame count,
    detecting that the distance value after the period of detection is more than a threshold distance value indicative of the movable object approaching the display, and
    in response to determining that the distance value is more than the threshold distance value, determining that the movable object underwent the change in direction of motion away from the display; and
    in response to determining that the movable object underwent the change in direction, preventing a false wake up of the display.

8. The method of claim 7, wherein the threshold distance value is a distance value of a first frame in a time sequence of the plurality of frames.

9. The method of claim 7, wherein determining that the movable object is approaching the display comprises determining that a distance between the movable object and the display in a second frame of a plurality of frames within a period of detection is less than the distance between the movable object and the display in a first frame of the plurality of frames, the second frame being a frame immediately following the first frame, and the period of detection being a time period over which a controller assigns a distance value indicative of a distance between the movable object and the display.

10. The method of claim 9, wherein determining that the movable object underwent a change in direction of motion away from the display comprises determining that a distance between the movable object and the display in a third frame of the plurality of frames is greater than the distance between the movable object and the display in the second frame.

11. The method of claim 7, further comprising:
determining that a further movable object is approaching the display;
determining that the further movable object is directed towards the display; and
in response to determining that the further movable object is directed towards to the display, activating a wake-up command to initiate waking up the display.

12. The method of claim 11, wherein determining that the further movable object is directed towards the display comprises
in response to determining that the further movable object is approaching the display, initiating a further period of detection having a further plurality of frames, the further period of detection being a further time period over which the controller detects a further distance value indicative of the distance between the further movable object and the display;
for each of the further plurality of frames, changing the further distance value to reflect whether the movable object is moving near or further from the electronic device; and
detecting that the further distance value after the further period of detection is less than a threshold distance value indicative of the further movable object approaching the display.

13. An electronic device comprising:
a time of flight (ToF) sensor attached to a display;
a controller; and
a memory for storing a program to be executed in the controller, the program comprising instructions when executed cause the controller to:
while the display is in a low power mode, detect a movable object within a field of view of the electronic device and in response, initiate a period of detection having a plurality of frames, the period of detection being a time period over which the controller detects a distance between the movable object and the display;
for each of the plurality of frames, change a distance value associated with the corresponding frame to reflect whether the movable object is moving near or further from the electronic device, wherein changing the distance value comprises incrementing or decrementing the distance value of an immediately preceding frame by a change value that increases with increasing frame count of the plurality of frames within the period of detection;
detect that the distance value after the period of detection is less than a threshold distance value indicative of the movable object approaching the display; and
in response to determining that the distance value is less than the threshold distance value, wake up the display.

14. The device of claim 13, wherein the instructions to change the distance value comprise instructions to:
determine that the distance between the movable object and the display for each of the plurality of frames;
increment the distance value in response to determining that a distance between the movable object and the display in a current frame is more than a distance between the movable object and the display in an immediately preceding frame; and
decrement the distance value in response to determining that the distance between the movable object and the display in the current frame is less than the distance between the movable object and the display in the immediately preceding frame.

15. The device of claim 14, wherein the instructions to change the distance value comprise instructions to:
increment or decrement the distance value by a time-weighted value based on a current frame count of the current frame.

16. The device of claim 14, wherein the instructions further comprise instructions to not change the distance value in response to determining that the distance between the movable object and the display in the current frame is equal to the distance between the movable object and the display in the immediately preceding frame.

17. The device of claim 13, wherein the threshold distance value is determined using an initial training process.

18. The device of claim 13, wherein the threshold distance value is a distance value of a first frame in a time sequence of the plurality of frames.

* * * * *